July 26, 1949.  C. N. CAHUSAC ET AL  2,476,958
SMOKE DETECTOR AND SIGNAL
Filed Sept. 28, 1946  3 Sheets-Sheet 1

INVENTORS
Clarence Noel Cahusac
Donald A. Diehl,
BY Harry B. Rook,
ATTORNEY

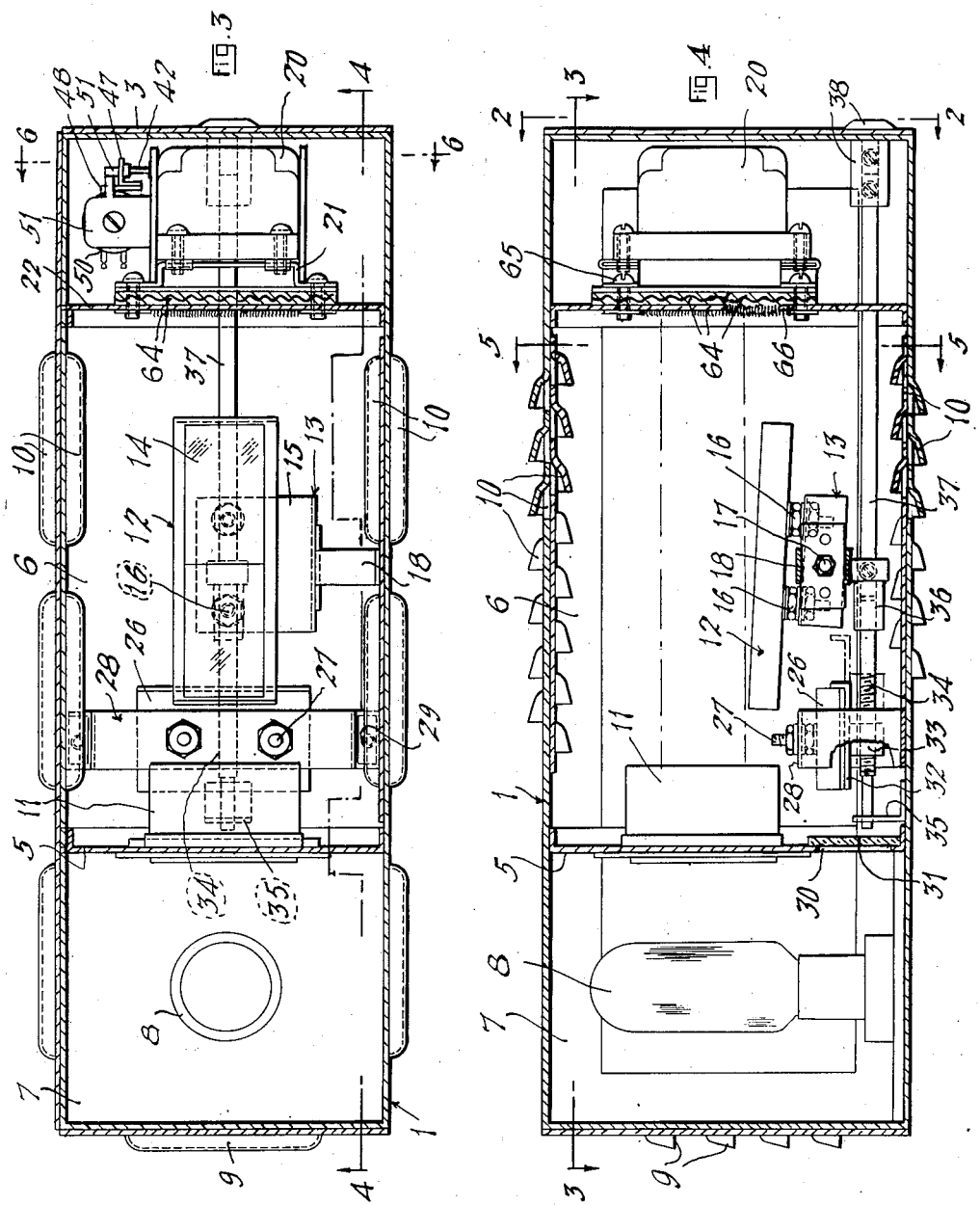

July 26, 1949.　　C. N. CAHUSAC ET AL　　2,476,958
SMOKE DETECTOR AND SIGNAL
Filed Sept. 28, 1946　　3 Sheets-Sheet 3
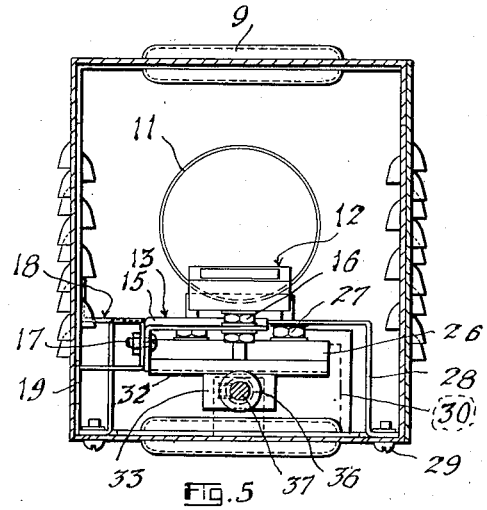
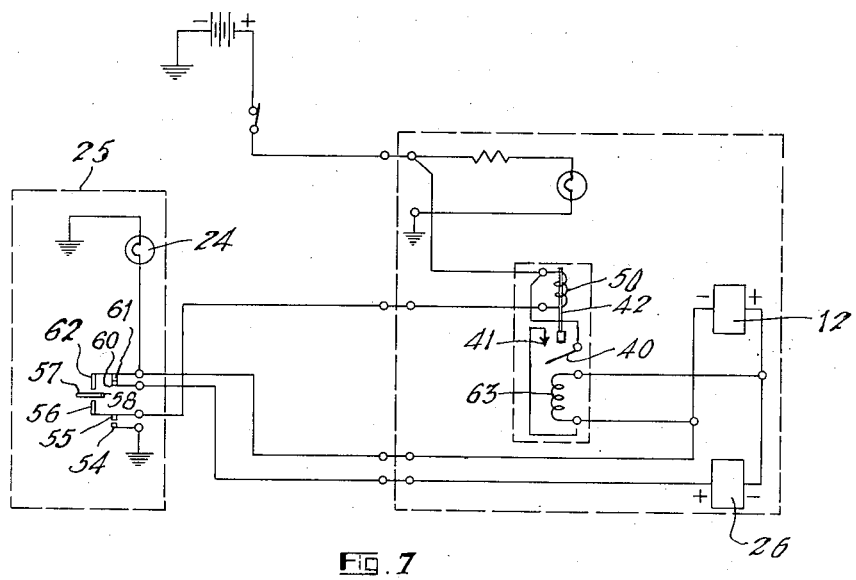
INVENTORS
Clarence Noel Cahusac
Donald A. Diehl,
BY Harry B. Rook,
ATTORNEY Patented July 26, 1949

2,476,958

UNITED STATES PATENT OFFICE 2,476,958

SMOKE DETECTOR AND SIGNAL

Clarence Noel Cahusac, Newark, and Donald A. Diehl, Arlington, N. J., assignors to C-O-Two Fire Equipment Co., Newark, N. J., a corporation of Delaware Application September 28, 1946, Serial No. 700,050

3 Claims. (Cl. 250—41.5)

1

This invention relates in general to apparatus for detecting and announcing the existence, at a point remote from the apparatus, of a fluid having particles of matter, such as smoke, suspended therein, and the invention relates to that disclosed in the copending application of Clarence Noel Cahusac and Frank B. Allen, Serial No. 604,892, filed July 13, 1945, which is especially adapted for detecting the presence of smoke in the various compartments of an aeroplane or the like, and for producing a signal—for example on an instrument board—to insure immediate warning of fires and prompt action to extinguish them.

In general, the apparatus comprises means for producing a beam of light, means for conducting a stream of fluid, such as smoke, into said light beam, a photoelectric element of the generative type located with respect to said beam and said fluid stream to receive light rays reflected from suspended matter in said fluid stream, another photoelectric element located to receive light rays transmitted through said fluid stream, means connecting said photoelectric elements in an electric circuit whereby the photoelectric effects of the second-mentioned element opposes the photoelectric effects of the first-mentioned element and an electrical responsive means, such as a relay, in said circuit for controlling the production of an audible or visible signal.

Means also is included for varying at will the extent of exposure of the second-mentioned photoelectric element to the light rays. With this arrangement, by adjustment of the means for varying the extent of exposure of the second-mentioned photoelectric element to the light rays, the effect of the light on the first-mentioned photoelectric element may be balanced by the effect of the light on the second-mentioned photoelectric element whereby a steady and normal setting of the electrical response device may be obtained. This arrangement also obviates the necessity of a voltage regulating apparatus for the light source, because the balance of the photoelectric cell circuit is maintained regardless of the intensity of the light source itself.

One object of the present invention is to provide a novel and improved means for testing the apparatus from the instrument board and for

2 resetting the electrical responsive device after any operation of the apparatus.

Another object is to provide such testing and resetting mechanism which shall embody novel and improved features of mechanical and electrical construction such that the same switch lever or button, and the same visible or audible electric element may be utilized for both testing and resetting operations.

A further object is to provide, in apparatus of this character, a novel and improved construction and combination of the light source, the balancing cell, and means whereby the effect of the light from the light source upon the balancing cell shall be capable of easy and accurate adjustment or control.

Other objects, advantages and results of the invention will be brought out by the following description in conjunction with the accompanying drawings in which:

Figure 3 is a horizontal sectional view approximately on the plane of the line 3—3 of Figure 4.

Figure 4 is a vertical longitudinal sectional view taken approximately on the plane of the line 4—4 of Figure 3.

Figure 5 is a transverse vertical sectional view taken on the plane of the line 5—5 of Figure 4.

Figure 7 is a wiring diagram of the electrical circuit for the smoke detector and signal.

Figure 1:
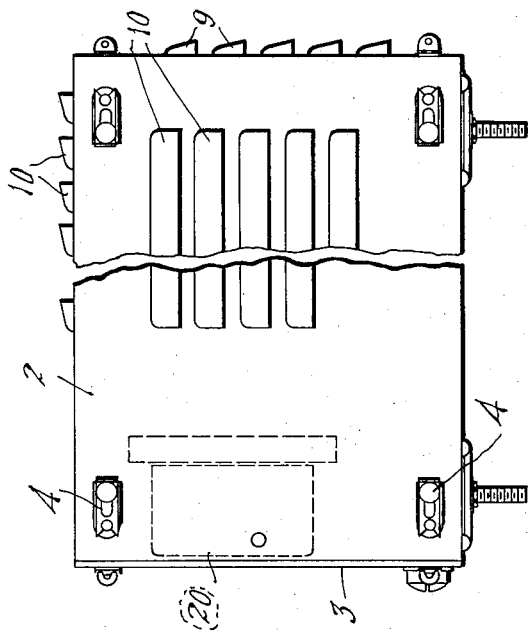
Figure 1 is a side elevational view of a smoke detector embodying our invention.

Specifically describing the illustrated embodiment of the invention, the reference character 1 designates the casing of the detecting unit which preferably has at least one side wall 2 and the end walls 3 removable for access to the parts in the casing, any suitable separable fasteners 4 being provided for connecting said side and end walls to the casing.

Within the casing is a partition 5 which divides the casing into a smoke compartment 6 and a compartment 7 for a light source 8, such as an incandescent lamp, said compartment 5 having openings or louvres 9 for passage of air through the compartment. The side, bottom and top walls of the smoke compartment 6 also have louvres 10 for the circulation of smoke into and through the compartment. These louvres are so constructed as to prevent the entrance of light into the casing in any such manner as to effect the photoelectric cells therein, and one satisfactory type of louvre is disclosed in a copending application of Clarence Noel Cahusac and Frank B. Allen, Serial No. 619,744, filed October 2, 1945.

In the partition 5, is a lens system 11 through which the light rays from the lamp 8 are directed into and longitudinally of the smoke compartment 6, so that said rays (represented by broken lines) are projected in a parallel beam through said compartment.

At least one photoelectric element 12 is adjustably mounted on a bracket 13 at one side of the light beam so as to be sensitive to the light rays reflected from the suspended matter in the fluid entering the casing. This photoelectric element may be of any suitable type, such as the current generating barrier layer type, and preferably has a large flat rectangular exposed light-sensitive surface 14 and is capable of generating sufficient current to operate a relay without amplification of the electricity.

Figure 2:
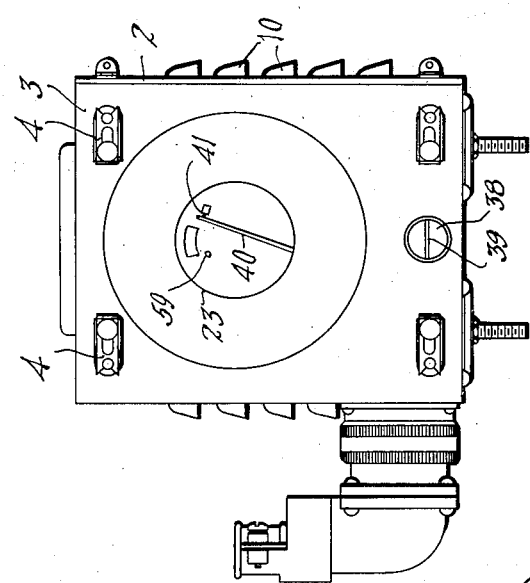
Figure 2 is an elevational view of one end thereof.

The light-sensitive surface is exposed in close proximity to the outer boundaries of the light beam and is tilted obliquely with respect to the light beam so that said surface is inclined away from the light source as shown in Figure 2, whereby greater sensitivity is obtained and the effect of stray light rays, when no smoke is present in the compartment, is substantially reduced. As shown, the bracket 13 comprises an angular strip of metal 15, on one flange of which the cell 12 is mounted by adjustable screws 16, while the other flange is tiltably connected, as by a screw 17, to the base portion of a U-shaped support 18, the arms of which are rigidly secured to one side wall of the casing in any suitable manner, for example soldering, as indicated at 19.

The photoelectric element 12 is connected in circuit with any suitable electric responsive device, for example a micro-ammeter, or, as shown, a relay 20 which may be mounted by a frame 21 on a transverse partition 22 in the casing forming the end of the smoke compartment 6 opposite the lens system, the face of the relay being exposed and visible through an opening 23 in the corresponding end wall of the casing. This relay controls another circuit which may include any desired electrically operated device, such as a signal lamp 24, located on the instrument panel 25, generally indicated by the broken lines in Figure 7 which is a diagram showing the circuit for the relay, a source of electricity, the photoelectric elements and the signal.

Another photoelectric element 26, which may be of the same general type as the element 12, is mounted by bolts 27 on a U-shaped bracket 28 that extends transversely of the casing and has its arms rigidly secured as by screws 29 to the bottom wall of the casing. The light-sensitive surface of said cell 26 faces downwardly toward and is spaced from the bottom wall of the casing as best shown in Figures 4 and 5, so as to be subject to light rays passing from the light source 8 through an opening 30 in the partition 5, and is reflected from the bottom wall of the casing onto the cell. Preferably, a transparent or translucent plate 31 is disposed across the opening 30 to protect the cell from the heat of the lamp, to diffuse the light and to prevent smoke entering the lamp compartment.

To vary the extent of exposure of the photoelectric element 26 to said reflected light rays, a shutter or baffle 32 overlies the light-sensitive surface of the cell and has connected thereto a nut 33, through which is threaded a screw 34, one end of which is rotatably mounted in a bracket 35 that is secured to the bottom wall of the casing. As shown, this screw 34 has a coupling element 36 at one end for connecting the screw to an operating shaft 37 which is rotatably mounted in and extends through the end wall of the casing adjacent the relay 20. The outer end of said shaft has connected thereto an operating element 38 which is rotatably mounted in the casing wall and has a kerf 39 for a screw driver, or other suitable means, to permit rotation of the shaft. This shaft is longitudinally non-movable.

With this construction it will be observed that by rotating the element 38, the screw 34 will be rotated so as to move the shutter 32 in such a way as to expose more or less of the light-sensitive surface of the cell 26 as indicated by solid and dot-and-dash lines in Figure 4, the solid lines showing the shutter in the position to completely cover the light-sensitive surface.

The photoelectric element 26 is connected in circuit with the photoelectric element 12 and the relay 20 in what is known as an "opposed parallel" arrangement, or so that the photoelectric effects of said elements are caused to operate in compensating differential or opposing relation; in other words, the electrodes of the element 26 are connected respectively to the opposite electrodes of the element 12 (see Figure 7).

With this construction, initially, the photoelectric cell circuit is so adjusted that the relay or other device 20 will assume a normal condition, for example, to open the signal circuit when no smoke is present in the compartment 6, and when smoke or other fluid, containing suspended matter, is caused to flow through the casing into the beam of light, some of the light rays will be reflected from the solid particles in the stream upon the photoelectric cell 12, whereupon the relay or other device 20 will be actuated by the current in the photoelectric cell circuit.

Figure 6:
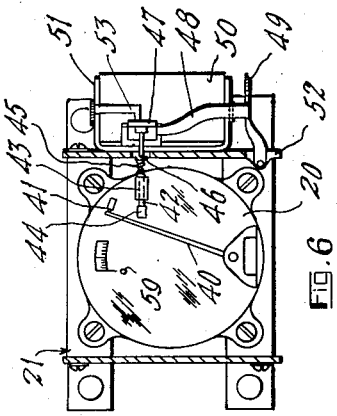
Figure 6 is a fragmentary transverse vertical sectional view taken approximately on the plane of the line 6—6 of Figure 3.

In the specific relay 20 illustrated in the drawings, there is a pointer or swingable contact arm 40 which is responsive to current in the photoelectric cell circuit and normally is spaced from a fixed contact 41, but is actuated into engagement with said contact when the photoelectric cell circuit is energized as shown in Figure 6.

It will be observed that the cells 12 and 26 will be continuously somewhat affected by stray light rays from the beam even when no smoke is present in the compartment, and the cells will be further affected by slight variations in the intensity of the light source 8 which, without some means to prevent it, will result in irregular or unsteady operation of the relay. By adjusting the shutter 32 when no smoke is present in the compartment 6, the effect of the light on the cell 12 may be balanced by the effect of the light on the cell 26 to insure a steady and normal setting of the relay pointer 40.

When the relay is energized by electricity generated by the photoelectric cell 12, its contact arm 40 engages the contact 41 and tends to remain in such contact. It is customary to provide means for resetting this contact arm from any desired remote point. For the purpose of illustration, we have shown a resetting rod 42 slidably mounted in a suitable bearing 43 and having a head 44 normally in spaced relation to the contact arm 40 when the latter engages the contact 41 as shown in Figure 6. For so holding the head 44, a compression spring 45 is interposed between the bearing 43 and a collar 46 on the rod, and said spring also holds the end of the rod 42 opposite the head 44 in abutting contact with a flange 47 which is connected to an arm 48 on an armature lever 49 that is actuated by an electromagnetic coil 50 that is in turn carried by a bracket 51 secured on an arm 52 projecting from the frame 21.

Normally, the spring 45 holds the lever 49 in spaced relation to the electromagnetic coil and movement of the lever under the influence of the spring is limited by a stop arm 53 on the bracket 51.

In accordance with the invention, we provide a switch mechanism operated by the same finger piece for both resetting the contact arm 40 of the relay and testing the apparatus to ascertain whether or not the photoelectric cells and the circuit are in operative condition. As shown, the electromagnetic coil 50 is connected in the electric circuit with a normally open switch which includes a fixed contact 54 and a movable contact 55 that is mounted on a spring arm 56 which in turn is actuated into switch-closing position by an operating lever or finger piece 57 that is pivotally mounted at one end, as indicated at 58, and will bear against the free end of the spring arm 56 when swung in one direction so as to force the movable contact 55 into engagement with the fixed contact 54 and close the circuit through the electromagnetic coil 50. This will result in actuation of the armature lever 49 so as to push the resetting rod 42 with a snap action against the contact arm 40 which thereby will be pushed back to its normal position against a zero stop pin 59.

The same switch-operating lever or finger piece 57 is utilized for operating the switch for testing the photoelectric cells and the circuit generally. This switch is shown as comprising a fixed contact 60 with which cooperates a movable contact 61 that is mounted on a spring arm 62 so that the contacts 60 and 61 are normally engaged in circuit-closing position. These two contacts are connected in the circuit so that when they are disengaged to open the circuit, the balancing photoelectric cell 26 is thrown out of the circuit while the main photoelectric cell 12 remains operatively connected in circuit with the operating coil 63 of the relay 20. When the balancing cell is thrown out of the circuit, the opposing effect thereof on the main cell 12 is eliminated and, consequently, said cell will be actuated by the light rays in the smoke chamber 6 even when no smoke is present. When the cell so operates, it is indicative that the whole system is in operative condition. Should the cell not operate in this manner, it would be apparent that something is wrong in the circuit.

It will be apparent that the contact 61 may be moved away from the contact 60 by movement of the operating lever or finger piece 57 against the spring arm 62 in the direction opposite to that in which the finger piece is moved to operate the spring arm 56 of the resetting switch. As shown, the finger piece or operating lever 57 may conveniently be located between the two spring arms 56 and 62, but other arrangements will occur to those skilled in the art.

In order to prevent or restrict reflection of the light rays in the light beam from the partition 22, we utilize a piece of light-absorbing material, preferably a piece of pile fabric such as plush 64, which may be secured at the outer side of the partition by the same screws 65 which connect the frame 21 to said partition, the plush or pile surface of the fabric being exposed through an opening 66 in the partition so that the light rays will impinge thereon.

For the purpose of illustrating our preferred embodiment of the invention we have shown certain specific constructions and combinations of parts, but it should be understood that many modifications and changes in the details of construction of the apparatus may be made within the spirit and scope of the invention.

The apparatus for detecting suspended matter in a fluid is claimed in co-pending applications owned by a common assignee, Serial Number 619,744 filed October 2, 1945, and Serial Numbers 74,341 and 74,342 filed February 3, 1949, as continuations-in-part of application Serial Number 604,892, in turn, filed July 13, 1945, and which issued as Patent 2,464,211 on March 15, 1949.

We claim:

1. The combination with a photoelectric system wherein there is a light source, two photoelectric elements of the generative type responsive to light from said source, means for varying the effect of light from said source upon one of said cells, means connecting said photoelectric elements in a circuit so that the photoelectric effects of one of said elements opposes the photoelectric effect of the other element, and electrically responsive indicating means in said circuit, of a normally closed switch in said circuit which when opened will cut one of said photoelectric elements out of said circuit so that said indicating means will be responsive only to the effect of light upon the other photoelectric element, for testing the integrity of the photoelectric elements and said circuit.

2. Apparatus for detecting suspended matter in a fluid, comprising means including a light source for producing a beam of light, a photoelectric element of the generative type responsive to light from said beam, means for conducting a stream of such fluid into said light beam to vary the effect of said light on said photoelectric element, a second photoelectric element responsive to light from said source relatively independently of the effect of said stream of fluid, means connecting said photoelectric elements in an electric circuit so that the photoelectric effects of said second photoelectric element opposes the photoelectric effects of the first-named photoelectric element, and electrical responsive means in said circuit, and a normally closed switch in said circuit which when open will cut one of said photoelectric elements out of said circuit whereby said responsive means will be responsive only to the effect of said light rays on the other photoelectric element and regardless of the presence of said fluid stream.

3. A combination as defined in claim 1, wherein said electrically responsive indicating means comprises a relay connected in circuit with a source of electricity and including a fixed contact and a movable contact arm which in normal position is spaced from said contact to open said relay, means in said photoelectric circuit by which said movable contact arm is electrically swung into engagement with said contact to close the relay, and with the addition of an electrically operated resetting mechanism for said movable contact arm, a second switch for controlling said resetting mechanism, and a common finger-piece for operating said switches selectively to cut out said photoelectric element and to reset said movable arm, respectively.

CLARENCE NOEL CAHUSAC.
    DONALD A. DIEHL.

REFERENCES CITED

The following references are of record in the file of this patent:

UNITED STATES PATENTS

| Number | Name | Date |
|---|---|---|
| 1,794,686 | Heinisch et al. | Mar. 3, 1931 |
| 1,828,894 | Freygang | Oct. 27, 1931 |
| 1,889,456 | Tillyer | Nov. 29, 1932 |
| 1,936,707 | Buchholz | Nov. 28, 1933 |
| 2,079,636 | Sharp | May 11, 1937 |
| 2,096,902 | Lamb | Oct. 26, 1937 |
| 2,150,467 | Stain | Mar. 14, 1939 |
| 2,278,920 | Evans et al. | Apr. 7, 1942 |
| 2,298,757 | Evans et al. | Oct. 13, 1942 |

FOREIGN PATENTS

| Number | Country | Date |
|---|---|---|
| 394,853 | Great Britain | July 6, 1933 |
| 605,886 | Germany | Nov. 20, 1934 |